Jan. 28, 1930.                E. R. BARRETT                    1,744,943
                         TRUCK BODY TILTING APPARATUS
                         Filed Oct. 3, 1927        4 Sheets-Sheet 1
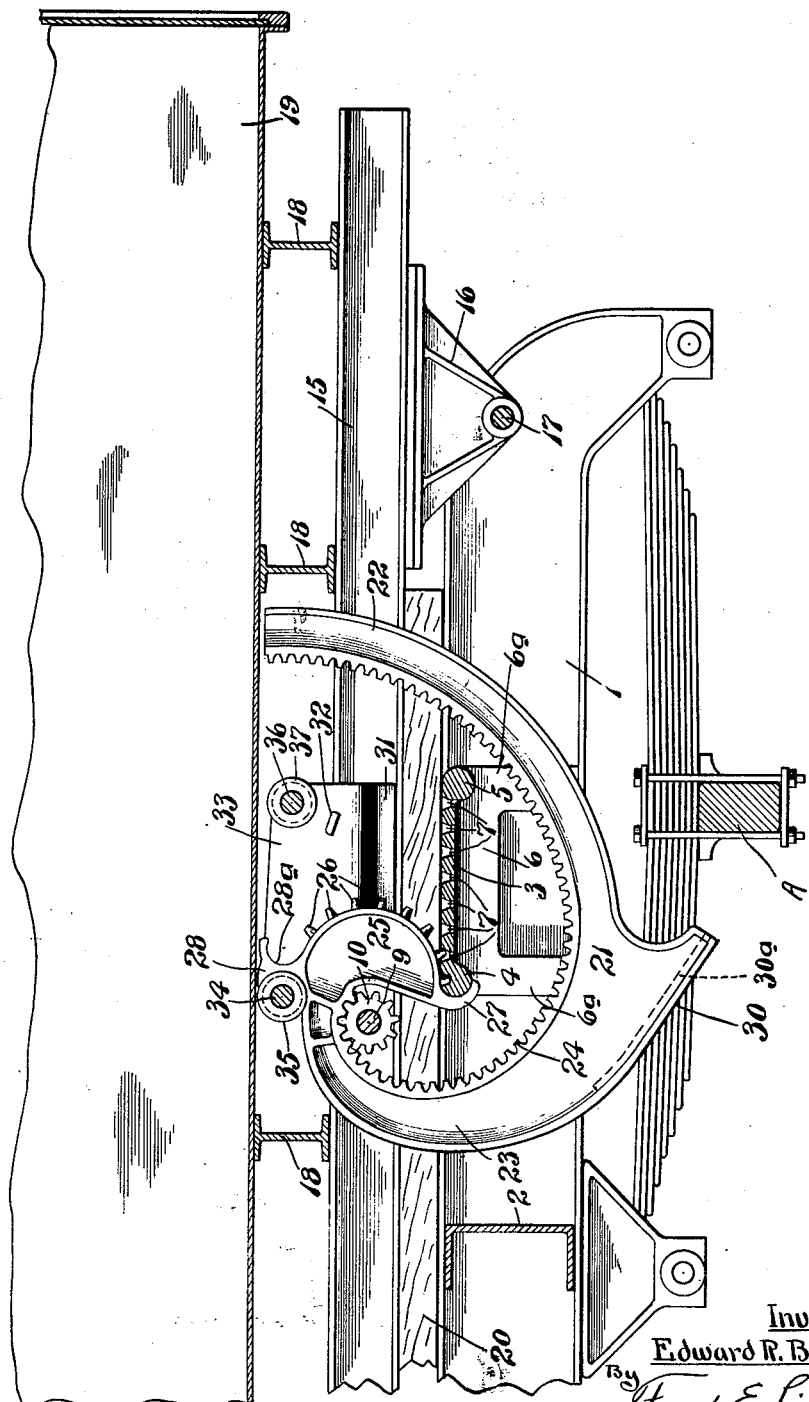
Inventor
Edward R. Barrett
By Frank E. Liverance, Jr.
Attorney.

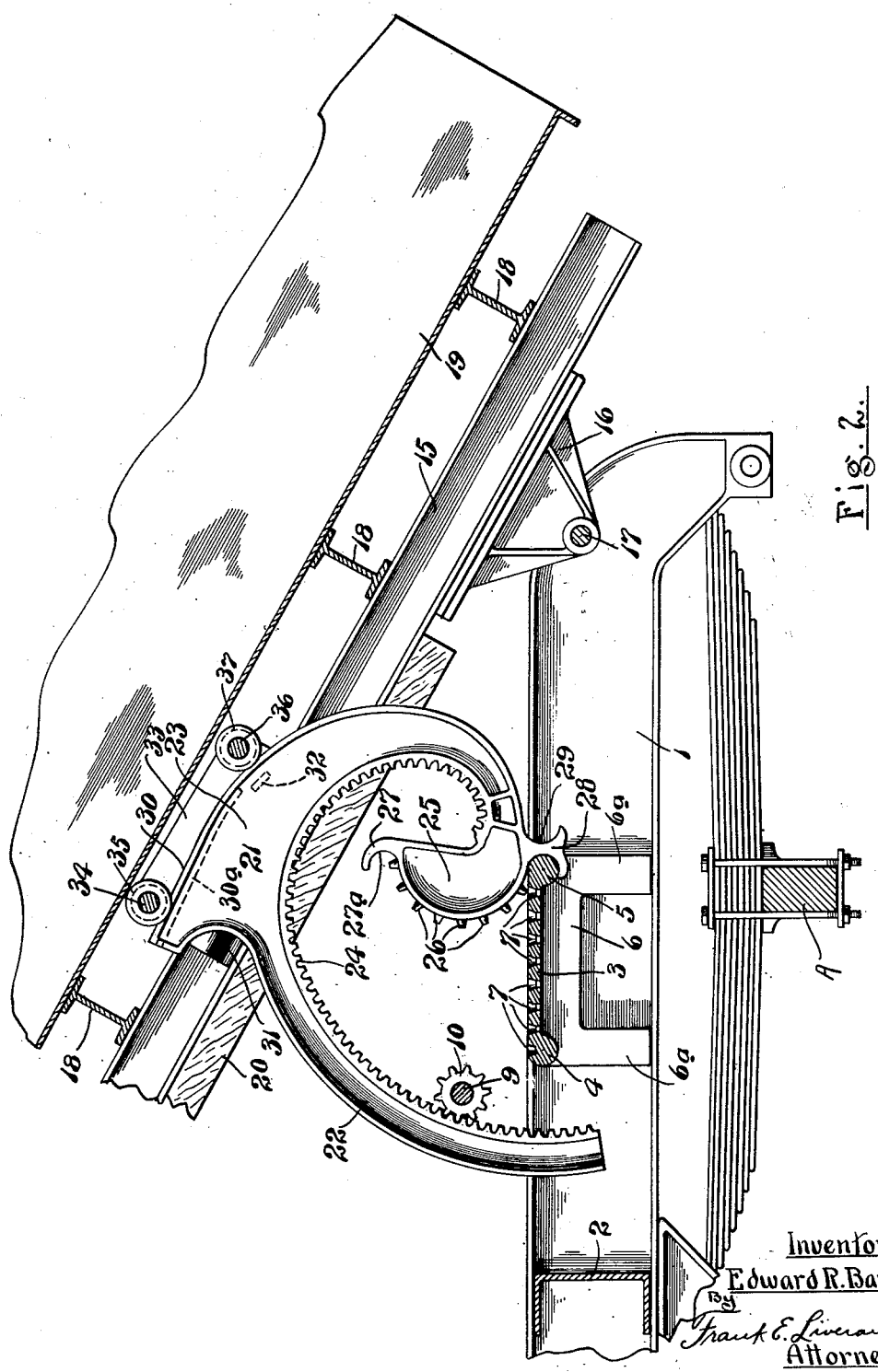

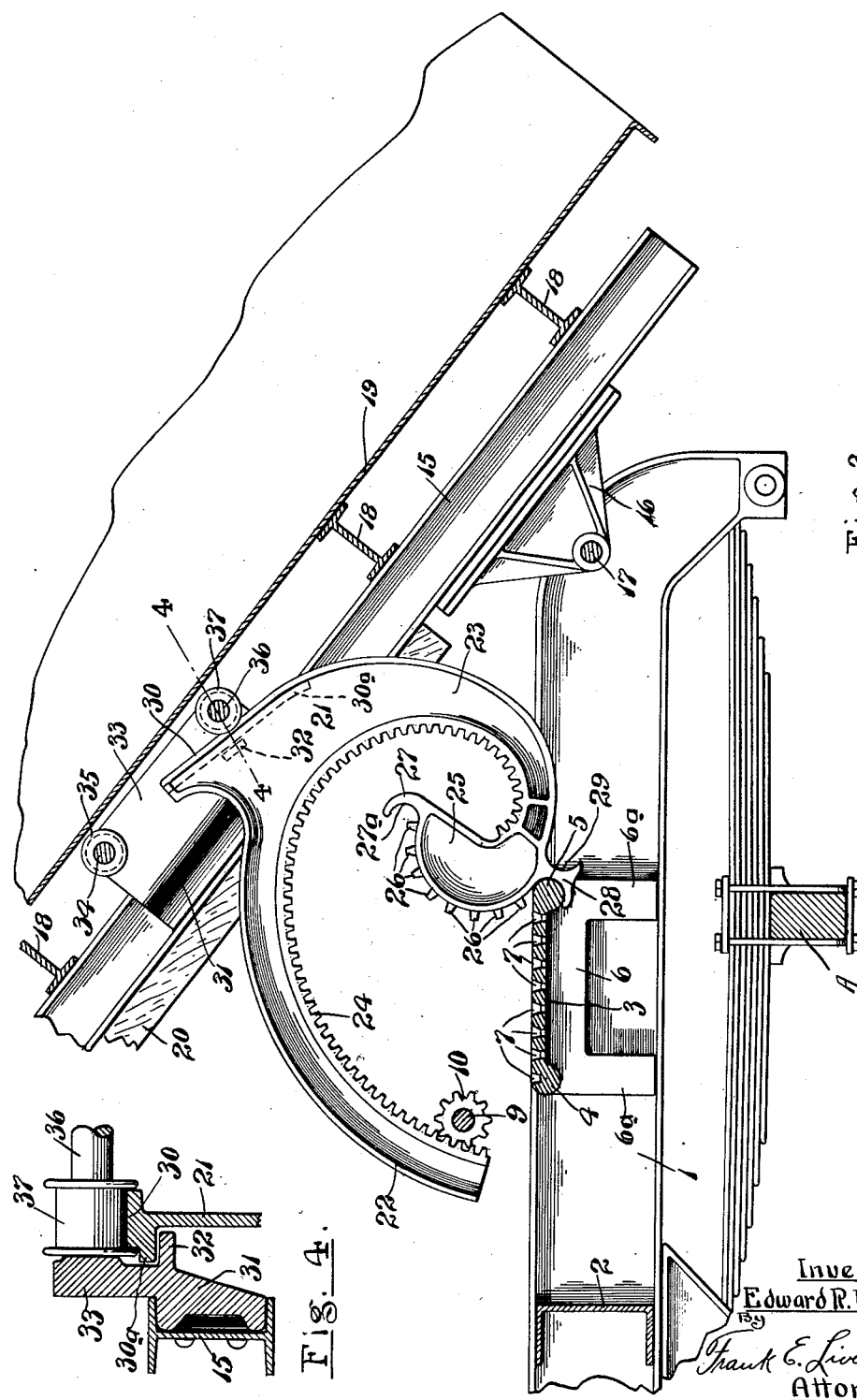

Jan. 28, 1930.  E. R. BARRETT  1,744,943
TRUCK BODY TILTING APPARATUS
Filed Oct. 3, 1927  4 Sheets-Sheet 4

Inventor
Edward R. Barrett
Attorney.

Patented Jan. 28, 1930

1,744,943

UNITED STATES PATENT OFFICE

EDWARD R. BARRETT, OF DETROIT, MICHIGAN, ASSIGNOR TO WOOD HYDRAULIC HOIST & BODY COMPANY, OF DETROIT, MICHIGAN, A CORPORATION OF MICHIGAN

TRUCK-BODY-TILTING APPARATUS

Application filed October 3, 1927. Serial No. 223,558.

This invention relates to a dumping body hoist. It is an object and purpose of the present invention to provide a hoist which may be located substantially over the rear axle of the motor vehicle on which it is installed and between the usual cross bracing of the truck frame whereby amply sufficient space for the installation of the hoist may be had without any problems for clearance being encountered, it being necessary only to avoid the rear axle with the installation as I have designed it. Such installation may be located comparatively low on a truck so that high center of gravity of load is avoided.

A further and primary feature of the invention is to provide a construction wherein there may be an acceleration of the speed of movement of the body from the time it starts to be tilted until its final and highest tilted position is reached. The construction which I have devised accomplishes this very satisfactorily, the movement of the body being slowest at the start and thereafter increasing. It is well known that the greatest effort in lifting a body hinged at the rear end is required at the beginning of the tilting movement. When the body has reached a 20 or 25 degree angle to the horizontal the load begins to shift or slide rearwardly and in addition the center of gravity of the combined load and body has moved rearwardly so that the effort required for the remaining elevation of the body is less than that at the beginning. With my invention advantage is taken of this fact to speed up the tilting of the body with its increasing elevation, the power remaining substantially constant. This saves time, a very desirable end, and there can be provided a greater lifting power and lower tilting speed at the start with a decreasing lifting power and increased speed as the body is lifted and tilted. A further advantage of an increased speed to tilting is that the load will be given a greater impulse to slide from the body with the increased speed of upward movement.

Another object and advantage successfully performed by the invention which I have made is that the body may be tilted to an exceptionally high angle with a resultant swift and sure discharge of the load and without injury and wear to tires now usually coming from the practice of giving the truck forward and back jerks in an effort to release material which does not discharge freely from the body.

A still further object and purpose is to provide a hoist elevated through gearing with an elimination of undue strains on the teeth of the gear, the construction being such that a plurality of teeth on the gears and pinions may sustain the load where previously the load as it has been elevated has been sustained substantially by one tooth on each of the intermeshing gear parts.

A yet further object and purpose of the invention is to tilt the body in two stages which merge one into the other and make it possible to build the construction of smaller size than would be required if it were accomplished by the single stage of action. My invention, however, is comprehensive of the single stage of action construction and is not to be limited in any sense by reason of the preference given to a construction having two stages of action. Finally, the construction devised is such that the rate of acceleration is equalized and is evenly graded so that there occurs no pausing or jerking or no lessening of the necessary leverage at any point in the travel of the body. Many other objects and purposes than those stated will be apparent as understanding of the invention is had from the following description taken in connection with the accompanying drawings, in which, Fig. 1 is a fragmentary longitudinal section through the rear portion of a dumping truck equipped with my invention, the body being shown in lower horizontal position.

Fig. 2 is a like view illustrating the body elevated substantially through the first stage of its tilting.

Fig. 3 is a like view illustrating the body after the same has been tilted to a position beyond that shown in Fig. 2 and in the second stage of tilting action.

Fig. 4 is a fragmentary transverse enlarged section taken substantially on the plane of line 4—4 of Fig. 3.

Like reference characters refer to like parts in the different figures of the drawings.

Figure 5:
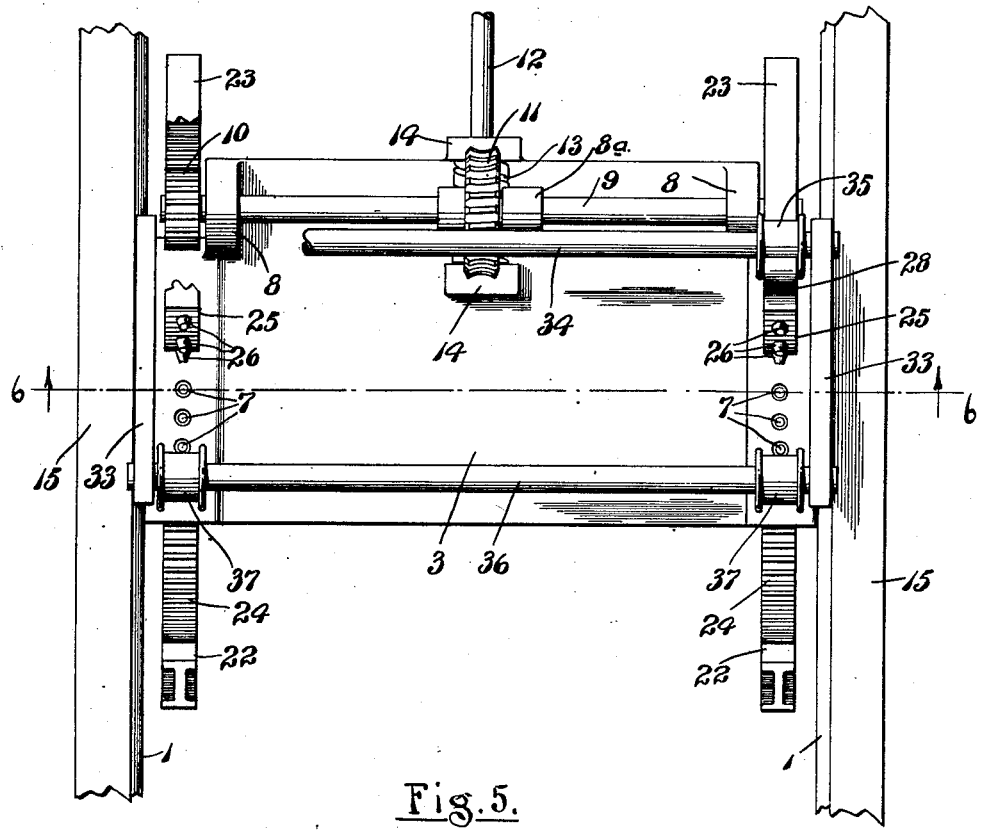
Fig. 5 is a fragmentary plan view of the hoist, the dumping body itself being removed from its sub-structure.

The truck frame may be of usual construction having side frame members 1 connected by usual cross members, one of which is indicated at 2. The cross members or braces of the frame in trucks invariably are disposed opposite the front and rear hangers of the rear springs which are attached to and over the axle indicated at A. In this space above the springs and between the side members 1 of the truck frame, a plate 3 of metal is located extending horizontally across the frame and at its front and rear edges being formed with bearing portions 4 and 5 of substantially cylindrical form. At each end of the plate 3 suitable brackets 6 are extended downwardly and fit within channels of the truck frame members 1 and have downwardly extending feet 6ª so that a very secure and permanent connection of the plate 3 may be made to the truck frame. Adjacent each end of the plate and near the upper flanges of the frame members 1 the metal is thickened and a plurality of spaced apart openings 7 are made in the width of the plate, this in effect making a rack at each end of the plate adapted to receive pinion teeth of a form designed to fit the openings as will later appear.

Figure 6:
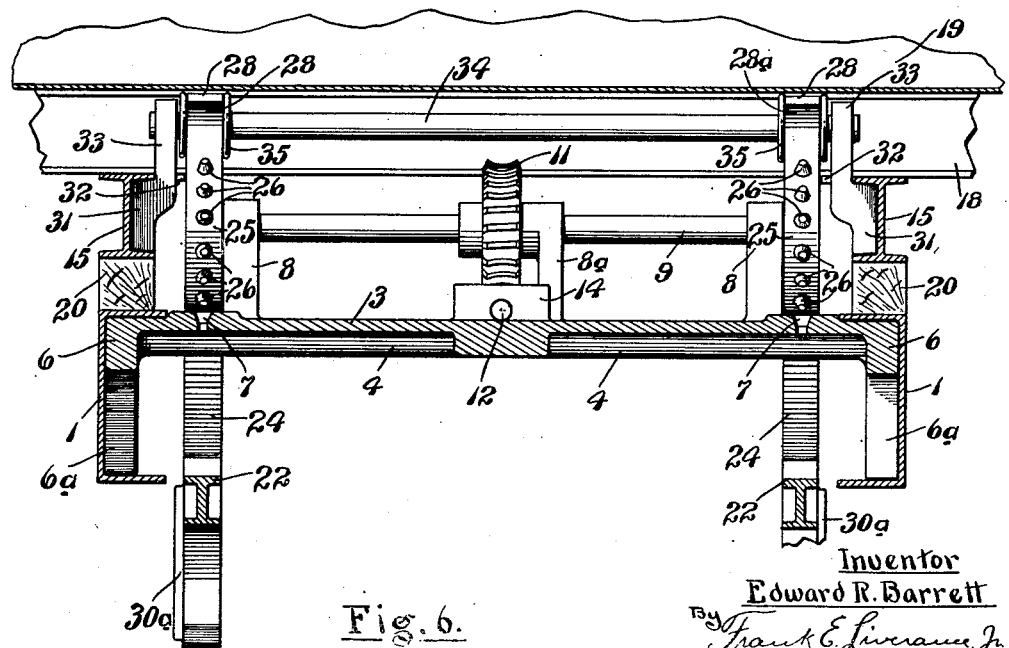
Fig. 6 is a fragmentary transverse section on the line 6—6 of Fig. 5.

Adjacent the front edge of the plate 3 and at spaced apart points, upwardly extending lugs 8 are cast integral with the plate 3 near each end thereof and an intermediate one 8ª between the two end lugs 8, as shown in Figs. 5 and 6. A shaft is rotatably mounted through and supported by the lugs, being equipped with a pinion or gear 10 at each end, and between its ends being provided with a worm gear 11. A power shaft 12 having any suitable design of power take-off from the transmission gearing of the truck, carries a worm 13 at its rear end which lies under and meshes with the worm wheel 11, the rear end of the shaft 12 being suitably supported through and in bearings in the lugs 14 integral with and extending upwardly from plate 3, as shown. By this structure the shaft 9 may be rotated continuously when desired.

In tiltably mounting the body on the frame two spaced apart side rails 15 are used one lying above each side member 1 of the truck frame. Each near its rear end and at its under side is equipped with bracket 16 which is pivotally mounted on a horizontal cross rod 17 carried by and between the truck frame members 1. The sub-frame for the body is completed by a plurality of transverse sills 18 preferably in the form of I-beams which lie above and are secured to the side rails 15 and on which the truck body 19 of conventional design is carried and secured. In practice at the under side of each of the side rails 15 and in front of the brackets 16 wooden bars 20 are secured which in the lowermost position of the body, as shown in Fig. 1, bear against the upper flanges of the truck frame members 1.

In the vertical plane of each of the pinions or gears 10 a rack member indicated as a whole at 21 is located, the same being of curved form and including two sections 22 and 23 integral with each other, the inner sides of which form a spiral curve, at which side a continuous rack 24 is cut. The section 22 of this member is substantially uniform in its cross sectional area from its free end to where it connects with the section 23. The section 23 has its greatest width where it connects with the section 22 and progressively decreases in width away therefrom so that its outer surface is a cam of the form shown in Figs. 1, 2 and 3. At the end of the section 23 having the smaller cross section, a head 25 of substantially semi-circular form is cast integral and extends inwardly toward the rack 24. On this head a plurality of tapered pins 26, spaced apart from each other, are located, of the proper shape and so spaced that they may engage and fit in the openings 7 in the plate 3, previously described. At one end of the head 25, the lower end as shown in Fig. 1, a hook 27 is integrally cast and projects downwardly, at its rear side (in Fig. 1) having a curved socket 27ª adapted to receive the rounded surface of the bearing portion 4 of the plate 3. Diametrically opposite a second hook member 28 projects from the head 25, at its rear side (in Fig. 1) having a similar socket 28ª which, in the operation of the hoist will come to and receive the rear bearing portion 5, as shown in Fig. 3. Said member 28 in its opposite side has a larger socket 29, the purpose of which will hereafter appear. At the wider end of the section 23 of member 21 and at its outer side the cam surface of said section 23 merges into a flat surface 30 extending substantially tangential to the curve of the cam surface where it joins the same. At this point the member 23 is equipped with a lateral projecting flange 30ª (see Fig. 4) which forms one element of a body lock, the description of which will shortly appear.

At the inner side of each of the longitudinal side rails 15 of the body sub-structure, a bracket 31 is secured projecting from which is a lug 32 which in one position of the dumping apparatus comes underneath the flange 30ª of the adjacent rack member, previously described. This lug is located near the rear end of its bracket 31. The bracket 31 is integrally extended above the upper side of the side rail 15 to which it is secured as indicated at 33. A shaft 34 is located horizontally between and carried at the front ends and near the upper portions of said extensions 33, being equipped adjacent each end with a roller 35. Similarly, a second horizontal shaft 36 is located between and carried by the rear ends and at the upper portions of said extensions 33 and is equipped, adjacent each end, with a roller 37.

*Operation.*—With the body in lowermost position, as shown in Fig. 1, it may be supplied with a load and when the place for dumping the load is reached, shaft 12 is driven thereby turning the horizontal cross shaft 9 and the gears or pinions 10 attached thereto which are in mesh with the racks 24. This causes a movement of the members 21, first from the position shown in Fig. 1 to that shown in Fig. 2. The heads 25 with their projecting teeth 26 move rearwardly over the racks made by the openings 7 in the ends of the plate 3. When the body is in lower position the sockets 27ª of the hooks 27 receive the bearing portion 4 and hook underneath the same while the sockets 29 of the second hook member 28 lie over the rollers 35. This is advantageous as it serves normally to hold the said rack members 21 and the body against vertical jouncing which is liable to occur when the truck is driven over roads with the body unloaded. At the end of the rearward movement of the heads 25 over the plate 3, the sockets 28ª of the second hook member 28 come against the vertical bearing portion 5, as shown in Fig. 2. The rack member 21 has been turned from the position shown in Fig. 1 to that shown in Fig. 2 and the rollers 35 ride upon the outer cam surfaces of the sections 23 of the rack members with a lifting or tilting of the front end of the body. This tilting in the beginning is relatively small but increases due to the design of the cam and shape of the rack 24, as is evident. As before stated this is of great advantage, the greatest power to be exerted against the load being required in the beginning when the load lies in horizontal position. After it has been tilted somewhat the tendency of the load to move toward the rear end of the body and the shifting of the center of gravity of the load and body to the rear diminishes the power required to tilt the body and correspondingly permits an increase in the speed of tilting, the driving power acting on the shaft 12 remaining constant.

The first stage of tilting is substantially completed when the members 28 come into engagement with the rear bearing portion 5 of the plate 3. At this time the rollers 35 have nearly reached the end of the surfaces 30 of the rack members and the cam surfaces of said members slightly ahead of where they join the surfaces 30 come into engagement with the rollers 37, as shown in Fig. 2. Continuation of the rotation of shaft 9 causes the outer cam surfaces of the rack members 21 to ride against rollers 37, the rack members as a whole turning about the axis of the bearing portion 5. This is illustrated in Fig. 3 and it is evident that by reason of the tangential relation of the surfaces 30 to the curvature of the cam surfaces the tilting of the body is considerably accelerated and the body may be tilted to an exceptionally high angle before the limit of tilting movement is reached. By locating the rollers 37 and the shaft 36 on which they are mounted farther to the rear the angle to which the body is tilted may be increased and in practice hoists of this character have been designed where the tilting angle of the body to the horizontal is substantially 70 degrees. At this angle material placed in the body, irrespective of its character, will dump without the necessity of jerking the truck back and forth as has heretofore been common practice.

It will be noted that when the rear rollers 37 come into place the lugs 32 on the rack members 21 are about to be brought underneath the laterally projecting flanges 30ª. This makes an interlock between the body and the rack members 21 which by reason of their connection to the pinions 10 and with the bearing portion 5 of the plate 3, are locked against disconnection from the truck frame. Any of numerous limit stops against too far an operation of the rack members 21 may be utilized, none being shown in the present construction as it is no part of the present invention.

With the construction described the objects and purposes and the advantages by reason thereof recited earlier, are fully attained in a practical and relatively simple manner. There are a great many variations in constructive detail which may be resorted to without departing from the invention and I have designed others capable of accomplishing like results. While the two stages of tilting have been shown and fully described it is apparent that a practical body hoist for tilting bodies may be made in which the second stage of tilting described will not be used. I, accordingly, consider my invention to be comprehensive of all forms of structure coming within the scope of the claims appended hereto and do not wish to be limited to the specific disclosure shown and described other than is necessitated by said claims.

I claim:

1. In combination, a truck frame, a body tiltably mounted thereon to turn about a horizontal axis located near the rear end of and below said body, members with racks at their inner sides mounted on the truck frame and having cam outer surfaces, means on the body engaging against said cam surfaces whereby the body is tilted when said members are actuated, gearing means engaging with said racks for actuating said members and turning the same rearwardly to elevate the body from horizontal to upward tilted position and means for causing said members to traverse the frame longitudinally as they are rotated.

2. In combination with a truck frame, a dumping body tiltably mounted thereon to turn about a horizontal axis located adjacent the rear end of the body, members movably mounted on said frame at opposite sides thereof each at its inner side having a continuous curved rack, the curve of which is of substantially a spiral, said members at their outer sides having cam surfaces, means on the body with which said cam surfaces engage to tilt the body when said rack members are actuated, and power driven gearing engaging with said racks to actuate the rack members.

3. In a construction of the class described, a truck frame, a body tiltably mounted thereon to tilt about a horizontal axis located at the rear end of the truck frame, a horizontal plate disposed between the sides of the truck frame having a rack adjacent each end, a curved member having a substantially semi-circular head at one end with teeth projecting therefrom to engage with each rack of said plate, said curved member at its inner side being curved substantially in spiral form and having a continuous rack formed thereon from said head to the free end of the member and at its outer side having a cam surface, power driven gearing engaging with the racks of said members whereby the same may be turned rearwardly, and means on the body against which the cam surfaces of said members bear to thereby elevate the body at its front end when said members are actuated to the rear.

4. A construction containing the elements in combination defined in claim 3, said plate at its front edge being formed with a substantially cylindrical bearing portion, and a hook extending from the head of each of said curved members having a socket to fit against said curved bearing portion when the body is in lowermost position.

5. A construction containing the elements in combination defined in claim 3, said plate at its rear edge being formed with a substantially cylindrical bearing portion, and a hook member projecting from said semi-circular head adjacent where it joins with its curved member, adapted to engage with the said bearing portion when the curved member is turned to the rear and the teeth on said head have traversed the rack with which it is associated on said plate, said members thereafter turning about the longitudinal axis of said bearing portion, substantially as described.

6. In a construction of the class described, a truck frame having spaced apart horizontal side members, a dumping body pivotally mounted on the frame to turn about a horizontal axis located between the rear ends of the truck frame sides, a horizontal plate extending between the sides of the truck frame and secured thereto in front of said axis, and at each end having a plurality of openings in longitudinal alignment, a member curved substantially in the form of a spiral and at one end having a semi-circular head extending inward toward the inner side of said member mounted at each end of the plate, teeth projecting from the heads in spaced apart relation to fit the openings in said plate and carry the members rearwardly as said members are turned to the rear, rack teeth formed on the inner side of each of said members, a horizontal shaft mounted on the plate, means to drive the same, pinions at the ends of the shaft engaging with the racks on said curved members, said curved members at their outer sides being formed with cam surfaces, and rollers carried by the body bearing against said cam surfaces whereby the body may be upwardly tilted on rotation of the horizontal shaft in one direction so as to rotate and bodily move said members to the rear, substantially as described.

7. A construction containing the elements in combination defined in claim 6, each of said heads at its inner portion being formed with a hook having a socket at one side and at its diametrically opposed outer portion with a hook member having a socket at each side thereof, and substantially cylindrical bearing portions at the front and rear edges of said plate, the first mentioned hook engaging with the front bearing portion when the body is in horizontal position and one socket of each of the second mentioned hook members engaging with a roller on the body when the body is in such position, the other socket of each of said second mentioned hook members engaging with the rear bearing portion on the plate when said members have been turned rearwardly far enough to traverse the width of said plate.

8. In a construction of the class described, a truck frame, a body tiltably mounted thereon, cam members movably mounted on the truck frame and adapted to rotate and traverse the frame a limited distance from the front to rear and vice versa, means actuated by rotation of the cam members for traversing them on the frame gearing for driving said cam members in said movements and means on the body against which the cam members bear for elevating the body on rearward movement thereof.

9. In combination, a truck frame, a body tiltably mounted thereon, cam members movably mounted on the frame to simultaneously rotate and traverse the truck frame from front to rear, gearing means for actuating the cam members, a pair of rollers for each cam member, one mounted in front of the other and carried by said body, said cam members bearing against the front roller of each pair of rollers when in horizontal position and during the first stage of tilting movement and leaving said front rollers and bearing against the rear rollers during the second stage of tilting movement.

10. A construction containing the elements in combination defined in claim 9, the surfaces of said cams on said cam members at the points adjacent where engagement with said second rollers of the pairs of rollers takes place, being substantially tangent to the curvature of the cams where they join the same.

11. In a construction of the class described, a truck frame, a body tiltably mounted thereon to turn about a horizontal axis located adjacent the rear end of the frame, said truck frame having spaced apart sides, a horizontal rack located adjacent each side of and connected to the truck frame, a semi-circular head having projecting teeth mounted on each rack, curved cam members extending from the head, the inner side of each of said cam members being curved in an arc having a progressively increasing radius of curvature, rack teeth cut on the inner side of each cam member, a horizontal shaft, means to drive the same, a pinion on each end of the shaft engaging with said racks of the cam members, and rollers on the body bearing against the outer sides of the cam members whereby the body may be tilted on driving said horizontal shaft in one direction.

12. A construction containing the elements in combination defined in claim 11, each of said cam members including two sections, one extending from said semi-circular head and progressively increasing in width for a distance and the other connecting with the first section and narrower than the widest portion of the first section and having substantially uniform cross section, the cam surfaces of said cam members being at the outer sides of the first named sections, and each being of curved form from the end of the section where it joins with said head for the greater portion of its length, the remainder thereof consisting of a flat surface tangent to the cam surface at the point where it joins therewith, and additional rollers carried by the body located back of the first mentioned rollers, the cam surfaces of said cam members leaving said first mentioned rollers during the tilting of the body and coming against the second mentioned rollers substantially at the points where said flat surfaces join the curved surfaces of the cam members.

13. In a construction of the class described, a truck frame, a body tiltably mounted thereon to turn about a horizontal axis located adjacent the rear end of the frame, two rollers mounted on the under side of the body forward of the axis and one roller located forward of the other, a cam member movably mounted on the truck frame against which the forward roller bears when the body is in lower horizontal position, and means for turning said cam member whereby the body is elevated, first by the cam member bearing against the front roller and, second by passing therefrom to bear against the rear roller.

14. In a construction of the class described, a truck frame, a body tiltably mounted thereon to turn about a horizontal axis located adjacent the rear end of the frame, two rollers mounted on the under side of the body forward of the axis and one roller located forward of the other, a cam member movably mounted on the truck frame against which the forward roller bears when the body is in lower horizontal position, and means for turning and moving said cam member rearwardly whereby the body is elevated, first by the cam member bearing against the front roller and, second by passing therefrom to bear against the rear roller.

15. In a construction of the class described, a truck frame, a body tiltably mounted thereon, a cam member having a rolling support on said frame, means for rotating said cam member whereby it will traverse the frame from front to rear thereof and vice versa, and means on the body against which the cam member bears for elevating or lowering the body on rotating and traversing movement of the cam member.

16. In a construction of the class described, a truck frame, a body tiltably mounted thereon, a cam member having a portion mounted for rolling support on the frame and a cam portion extending eccentrically therefrom, means for rotating the cam member whereby it will roll on and traverse the frame from front to rear thereof and vice versa, and means on the body against which the cam surface of the cam member engages.

17. In a construction of the class described, a truck frame, a body tiltably mounted thereon, a cam member having a portion mounted for rolling support on the frame and a cam portion extending eccentrically therefrom, means for rotating the cam member whereby it will roll on and traverse the frame from front to rear thereof and vice versa, and a plurality of means on the body spaced apart from front to rear thereof consecutively engaged by said cam surface upon rotation of the cam member.

In testimony whereof I affix my signature.

EDWARD R. BARRETT.